Patented Mar. 4, 1924.

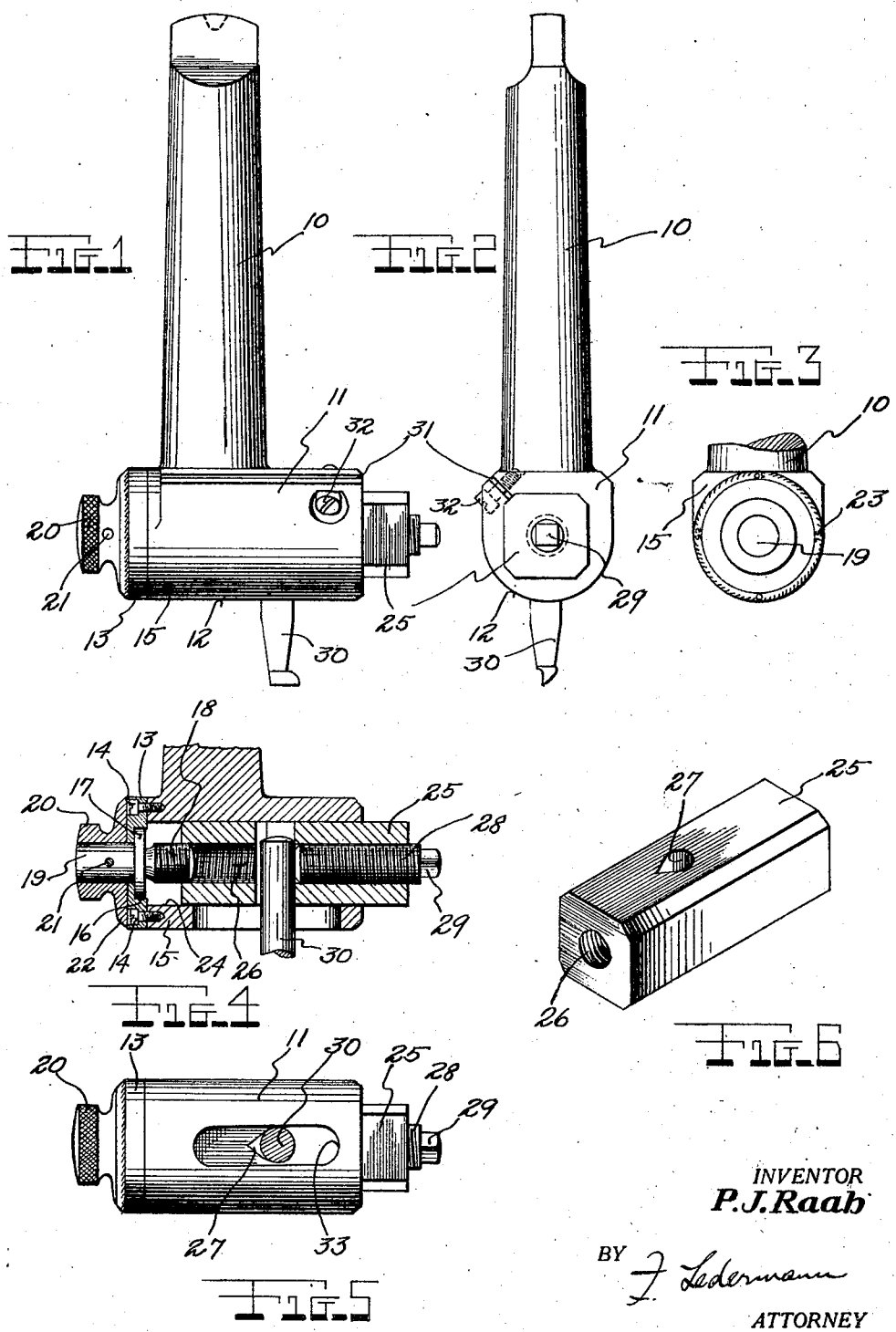

1,485,937

UNITED STATES PATENT OFFICE.

PHILIP J. RAAB, OF BEAVER FALLS, PENNSYLVANIA.

ADJUSTABLE BORING TOOL.

Application filed March 6, 1923. Serial No. 623,295.

*To all whom it may concern:*

Be it known that I, PHILIP J. RAAB, a citizen of the United States, residing at Beaver Falls, in the county of Beaver and State of Pennsylvania, have invented certain new and useful Improvements in Adjustable Boring Tools, of which the following is a specification.

This invention relates to machine tools, particularly to boring heads, and the main object is to provide a tool which may be fitted to any type of lathe, milling machine, or drill press, for the purpose of recessing, counterboring, or enlarging a hole in a piece of material being worked on.

Another object is to provide a head in which an adjustable bar is provided and receives a cutting tool, said bar when shifted being adapted to offset the cutting tool with respect to the rotational axis of the head.

These and other objects will become apparent from the description below, in which similar characters of reference refer to like-named parts in the drawings.

Referring briefly to the drawings, Figure 1 is a side elevational view of the boring head.

Figure 2 is an end elevational view of the same looking toward the tool locking means.

Figure 3 is an end elevational view looking toward the cutting tool adjustment knob.

Figure 4 is a sectional elevational view of the boring head showing the cutting tool adjustment means in detail.

Figure 5 is a bottom plan view of the boring head.

Figure 6 is a perspective view of the cutting tool holder bar.

Referring to the drawings in detail, the numeral 10 indicates a relatively long tapering shank common to these types of tools and is adapted to be fitted into the spindle of a drill press, or milling machine. The main body 11 of the boring head is shaped square, the corners being chamfered, and the lower portion is semi-circular in shape as indicated by the numeral 12. Both the body and shank are preferably formed of a single piece of material in order to give rigidity to the tool. The forward end 15 of the body has an annular plate 13 secured thereto by screws 14 threaded into the wall of the body. Said plate has an internal recess 16 therein in which is seated the flange 17 of the adjusting screw 18. A stud 19 projects from the opposite sides of the flange and passes thru a hole in the plate 13. The projecting end of the stud receives a knurled knob 20, the latter being secured to the stud by the taper pin 21. Said knob has an enlarged flange 22, the edge of which is knurled and provided with graduations 23 indicative of the distance moved by the bar member 25 described below.

The main body 11 has a square passage 24 extending entirely therethru, said passage having an adjustable bar 25 of similar conformation, slidable therein. Said bar has a threaded hole 26 which passes longitudinally thru the entire length of the bar. Intermediate the length of the bar and offset somewhat from the center with respect to its length, is an opening 27 which traverses the threaded hole 26 at right angles. The opening 27 is semi-circular at one side, the opposite side being formed into a triangle, as illustrated in Figures 5 and 6. A stud screw 28 having a squared end 29 is inserted into the hole 26 at the end exposed for manipulation. Said screw 28 is rotated into the bar and is adapted to retain a cutting tool 30, in place in the opening 27, the screw rigidly clamping the cutting tool within the opening. One of the corners of the body 11 is provided with a slit 31 which traverses the length from a point aligned with the periphery of the shank 10 and which opens at the opposite end of the body. The slit 31 makes the wall of the body 11 somewhat resilient, and a small screw 32 which crosses said slit at one end of the body closes said slit when locking the bar in place and relieves the screw 18 from excessive strain. The lower part of the body has a longitudinal channel 33 extending partly thru its length, the cutting tool projecting thru said channel.

In use the shank 10 is centered by jamming it into the spindle of a machine, said shank forming the axis of rotation for the tool.

When desiring to give the cutting tool a certain radius with respect to the axis of the tool, the knurled member 20 is rotated. Member 18 which is engaged in the threaded hole 26 at the interior end of the bar 25, either extends or retracts the said bar 25. As the cutting tool 30 is rigidly secured in the opening 27 of the bar, it will be moved correspondingly. The distance that the cutting tool is offset from the axis of rotation may be carefully noted by observing the numerals 23 on the knob flange 22 which may be made equivalent to the linear movement of the bar 25.

The slit 31 formed angularly at the upper end of the body gives the latter the resiliency desired. When the bar 25 has been shifted to its final position by the screw 18, the screw 32 is manipulated. By doing this the slit is reduced and the wall of the body is drawn around the bar 25, thereby aiding in retaining the bar in position and partially relieving the strain on the feed screw 18, which would otherwise be compelled to retain the bar in position.

I claim:—

A boring head comprising a main horizontal body having a square longitudinal passage, a tapered shank formed at one end of said body, said body having a slit extending parallel to its axis and adapted to give resiliency to the wall of said body, a screw at one end of said body traversing the slit, a square bar slidable in said body and having a longitudinal threaded hole, said bar having an opening passing thru said bar at right angles to the threaded hole, the opening being offset with respect to the length of the bar, the opening being adapted to receive a cutting tool, a screw stud engaging the threaded hole in the bar and being adapted to retain the cutting tool in place in the opening, the slit when closed being adapted to lock the slidable bar in position in the body, a screw at the shank end of said body engaging the threaded hole in the corresponding end of the bar, said screw when rotated being adapted to offset the cutting tool with respect to the axis of the shank, and means for retaining said screw in place in the body.

In testimony whereof I affix my signature.

PHILIP J. RAAB.